US007612478B2

(12) United States Patent  (10) Patent No.: US 7,612,478 B2
Marioni  (45) Date of Patent: Nov. 3, 2009

(54) PERMANENT-MAGNET ROTOR FOR A SYNCHRONOUS MOTOR PARTICULARLY FOR A WASHING MACHINE PUMP FOR INDUSTRIAL AND DOMESTIC USE AND THE LIKE

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 11/560,164

(22) Filed: Nov. 15, 2006

(65) Prior Publication Data

US 2007/0114867 A1    May 24, 2007

(30) Foreign Application Priority Data

Nov. 18, 2005  (EP)  .................................. 05425815

(51) Int. Cl.
 *H02K 21/12*  (2006.01)
(52) U.S. Cl. ............................. 310/156.28; 310/156.23
(58) Field of Classification Search ............ 310/156.23, 310/43, 156.28; 417/423.7; 29/596
See application file for complete search history.

(56) References Cited

U.S. PATENT DOCUMENTS

| 3,979,821 | A | * | 9/1976 | Noodleman | .................. 29/598 |
| 4,219,752 | A | | 8/1980 | Katou | |
| 4,227,105 | A | * | 10/1980 | Kumakura | ................. 310/153 |
| 4,423,345 | A | | 12/1983 | Nilsson | |
| 4,433,473 | A | | 2/1984 | Benedetti | |
| 4,625,135 | A | * | 11/1986 | Kasabian | ............... 310/156.28 |
| 4,827,173 | A | * | 5/1989 | Corbach et al. | ............. 310/218 |
| 4,973,872 | A | * | 11/1990 | Dohogne | ............... 310/156.28 |
| 5,140,210 | A | * | 8/1992 | Shirakawa | ............ 310/156.28 |
| 5,939,809 | A | * | 8/1999 | Mobius | ................. 310/156.28 |
| 6,324,745 | B1 | | 12/2001 | Poag et al. | |
| 6,657,348 | B2 | * | 12/2003 | Qin et al. | ............... 310/156.28 |
| 2002/0079770 | A1 | * | 6/2002 | Lai et al. | ............... 310/156.28 |
| 2004/0232788 | A1 | * | 11/2004 | Marioni | ....................... 310/90 |

(Continued)

FOREIGN PATENT DOCUMENTS

DE    1 072 720 B    1/1960

(Continued)

*Primary Examiner*—Quyen Leung
*Assistant Examiner*—Alex W Mok
(74) *Attorney, Agent, or Firm*—Akerman Senterfitt

(57)    ABSTRACT

A method for obtaining, in a quick way, a strong, compact and waterproof permanent-magnet rotor (3), intended for a synchronous motor (1), particularly for pumps of washing machines for industrial and domestic use and the like, of the external stator (2) type, comprising a cylindrical hollow core (6) surrounded by a plurality of permanent magnets (10) comprising the steps of arranging a cup-like body (7) with a base end (8a), a free end (8b) and a side wall (9) exhibiting a plurality of passing longitudinal recesses (12) which define, between the same, a plurality of positioning seats (13) for the magnets (10), providing to insert the core (6) into the cup-like body (7) and arrange the magnets (10) in said seats (13) and injecting a plastic material with obtainment of a cage-like structure (50) having opposite bottoms (27, 28) abutting at the ends (8a, 8b) of the cup-like body (7) as well as columns (29) extended between the opposite bottoms (27, 28) housed in the recesses (12).

The invention also relates to a rotor (3) obtained by means of the present method.

11 Claims, 3 Drawing Sheets

U.S. PATENT DOCUMENTS

2004/0239202 A1* 12/2004 Dooley .................. 310/184
2005/0104467 A1* 5/2005 Corengia .............. 310/156.28

FOREIGN PATENT DOCUMENTS

| DE | 42 24 757 A1 | 2/1994 |
| JP | 53 98013 A | 8/1978 |
| JP | 2002 010536 A | 1/2002 |

\* cited by examiner

PERMANENT-MAGNET ROTOR FOR A SYNCHRONOUS MOTOR PARTICULARLY FOR A WASHING MACHINE PUMP FOR INDUSTRIAL AND DOMESTIC USE AND THE LIKE

FIELD OF APPLICATION

The present invention relates to a method for obtaining a permanent-magnet rotor for a synchronous motor, particularly for a pump of a washing machine for industrial, domestic and similar use.

More in particular, the present invention relates to a rotor comprising a cylindrical central core, with axis X-X and an axial passage, surrounded by a plurality of permanent magnets, having an extrados, an intrados and side edges.

The invention also relates to a rotor obtained according to the present method.

PRIOR ART

In the specific technical field of permanent-magnet synchronous motors with rotor inside the stator, using rotors wherein magnets are associated with a central core by means of, for example, an adhesive is known.

These rotors, during the operation of the motor, are subjected to a high centrifugal force with the consequence that the magnets tend to detach from the core.

A possible known solution is that of inserting the core with the magnets being glued, into a sleeve which allows to contain the magnets during the motor operation.

Usually the sleeve is realised in metallic material, generally stainless steel sheet, of minimal thickness so as to have the greatest structural resistance and to maintain a magnetic gap, i.e. a distance between stator and rotor, of the lowest value possible.

The drawback this solution however exhibits is that the sleeve in metallic material in the presence of the magnetic field induced between rotor and stator, causes induced currents with a subsequent dissipation of energy. Moreover, as a consequence of the heating of the permanent magnets, due to the parasite currents, there is a reduction of the magnetic induction of the rotor field.

In the case of rotors immersed in a fluid, realising a system of protection of the rotor is also known, so as to avoid that the core and the magnets can be deteriorated through corrosion. In fact, it had been suggested incorporating the components of the rotor for example with co-moulding techniques.

Although being advantageous, the co-moulding is not exempt from drawbacks, in fact, the presence of rotor components, realised in metallic and massive ferromagnetic material, requires a previous heating step before the insertion of the rotor components into the mould to prevent, in the successive solidification and/or crystallisation process of the plastic material used, thermal discontinuity areas from being formed, such areas altering and jeopardising the structural resistance of the rotor especially with the high rotation speeds being usual during the pump operation.

In fact, during the operation of the pump, the high centrifugal forces applied to the rotor magnets with possible faults induced into the material by a non conform co-moulding process, determine an unbalance of the rotor with greater wears of the supports and possible breakages of the rotor itself, as well as a noise, both mechanical and magnetic, with a subsequent annoying acoustic emission.

The pre-heating step of the rotor components implies further drawbacks during a productive process in automation. These drawbacks are linked to the pre-heating time of the components themselves and they are not technically easy to be solved and they imply an increase of the rotor final costs due to the negative incidence of this latter step of the productive process.

A further drawback of the rotors, realised according to the known methods, is linked to the fact that the magnets, associated with the core, can, due to the flow of the plastic material under high pressure and temperature during the co-moulding, move, causing a loss of the electromechanical performances of the rotor and a mechanical unbalance of the same.

It is good also to note that the co-moulding defines material thicknesses which imply an increase of the rotor volume and a subsequent reduction of the magnetic gap, with a decrease of the torque generated and a subsequent loss of performances of the motor.

The technical problem underlying the present invention is that of devising a simple and quick method to manufacture a particularly compact permanent-magnet rotor, which allows to overcome the drawbacks cited with reference to the prior art.

SUMMARY OF THE INVENTION

The solution idea underlying the present invention is that of positioning the magnets and the core and of maintaining them positioned, according to the final desired position, with a co-moulding which minimises the volume of the rotor maximising the structural resistance and the reliability of the rotor during the high speed operation.

On the basis of this solution idea, the technical problem is solved by a method to obtain a permanent-magnet rotor (3), for a synchronous motor (1), particularly for a pump of a washing machine for industrial and domestic use and the like, with external stator (2), comprising a cylindrical central core (6), with axis X-X and an axial passage (11), surrounded by a plurality of permanent magnets (10) having an extrados (16) and an intrados (17) and side edges (18,19), characterised in that it comprises the following steps:

- arranging a cup-like body (7), in a plastic material, comprising a base end (8a), an open end (8b), a side wall (9) and a plurality of passing longitudinal recesses (12) formed in the side wall (9) and defining positioning seats (13) for a positioning of the magnets (10);
- inserting the central core (6) in the cup-like body (7) and arranging, in correspondence with the positioning seats (13), the magnets (10);
- obtaining, by injection of a plastic material, a cage-like structure (50) having opposite bottoms (27,28) and columns (29) extended between said opposite bottoms (27, 28), wherein said opposite bottoms (27,28) abut at the ends of the cup-like body (7) and the columns (29) are housed in the recesses (12).

The invention also relates to a permanent-magnet rotor for a synchronous motor as defined by claim 6.

Further characteristics and the advantages of the method and of the rotor obtained according to the invention will be apparent from the following description of a preferred embodiment thereof given by way of indicative and non limiting example with reference to the annexed drawings.

DETAILED DESCRIPTION

With reference to the annexed figures, a fluid circulation electrical pump is globally and schematically shown with 100 comprising a synchronous electric motor 1, wherein an external stator 2 is centrally crossed by a rotor 3.

Figure 1:
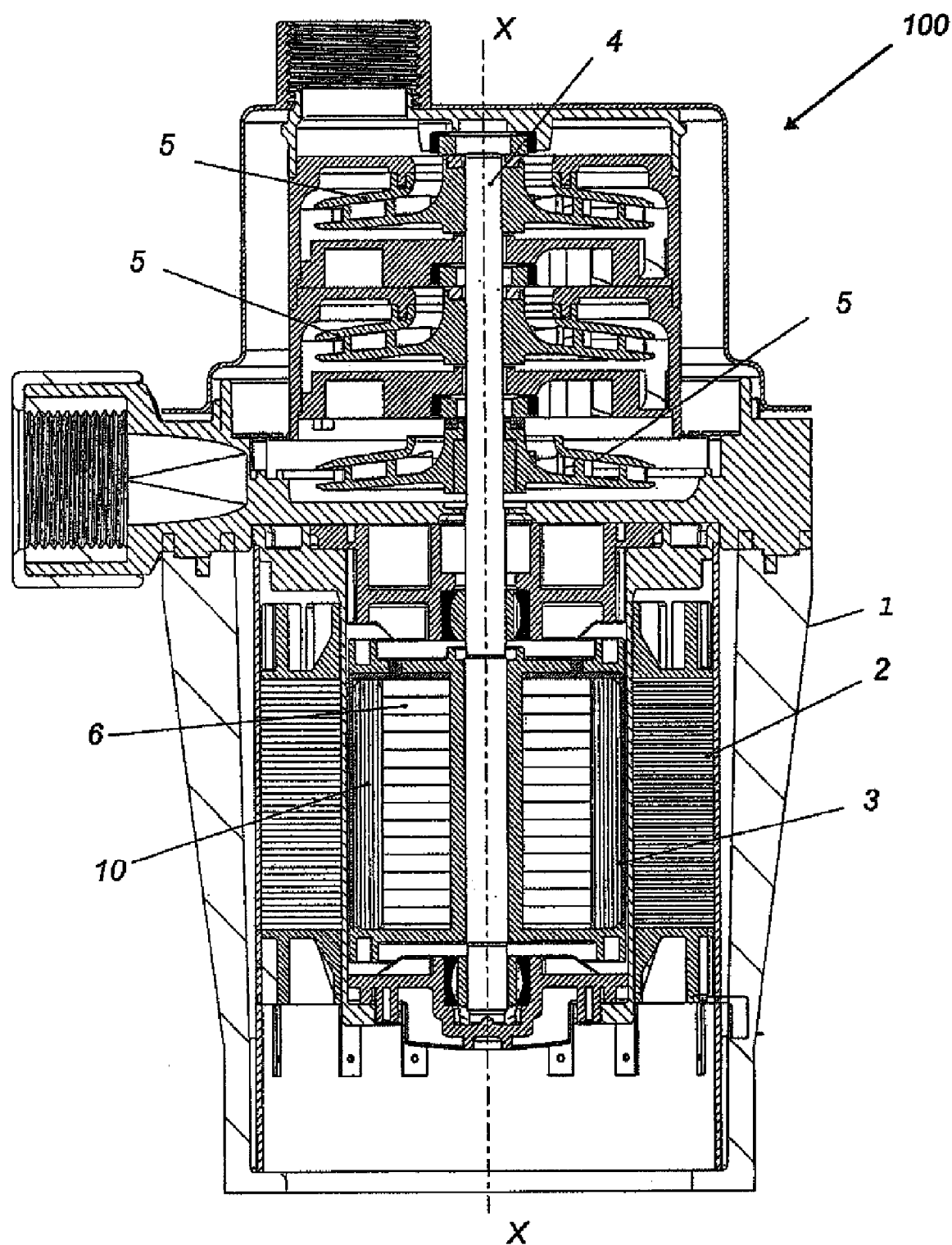
FIG. 1 schematically shows a section view of an electrical pump for washing machines and similar household appliances, incorporating a rotor realised according to the present invention.

As shown in FIG. 1, the permanent-magnet rotor 3 is keyed on a driving shaft 4 which brings in rotation at one end a plurality of kinematically connected impellers 5. In the embodiment shown, the impellers 5 are three.

The rotor 3 is induced in rotation by the electromagnetic field generated by the stator 2, equipped with pole pieces with relative windings, and it comprises a central core 6, realised like a lamination package, externally surrounded by a plurality of permanent magnets 10.

Figure 3:
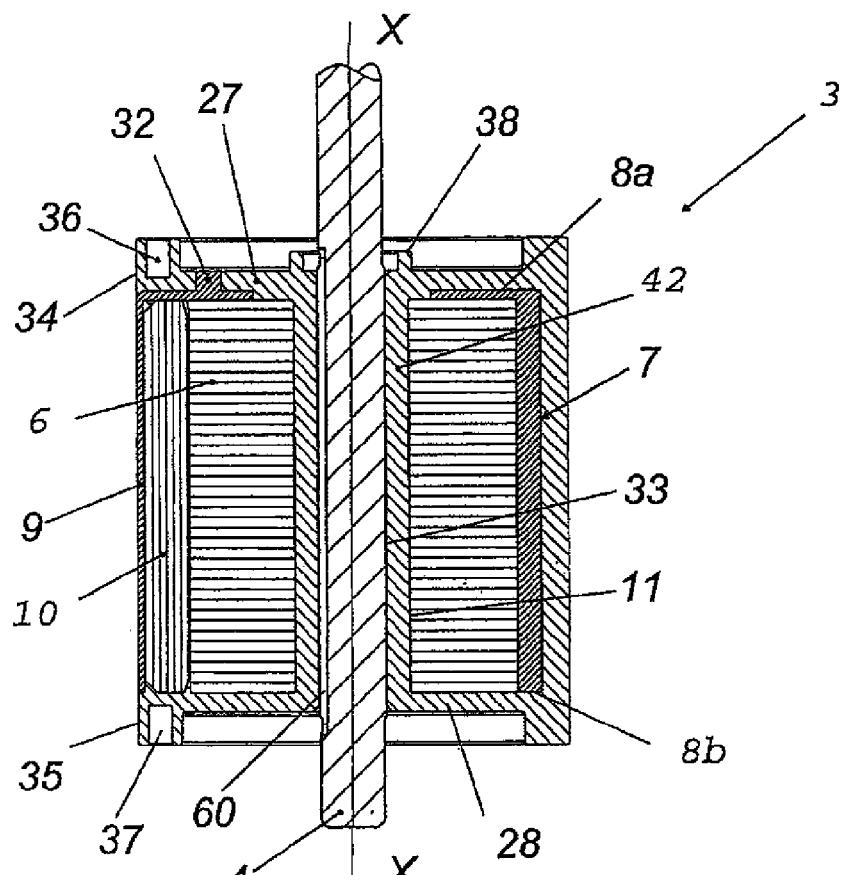
FIG. 3 shows a view of the rotor of FIG. 2 realised along the section lines I-I.
Figure 2:
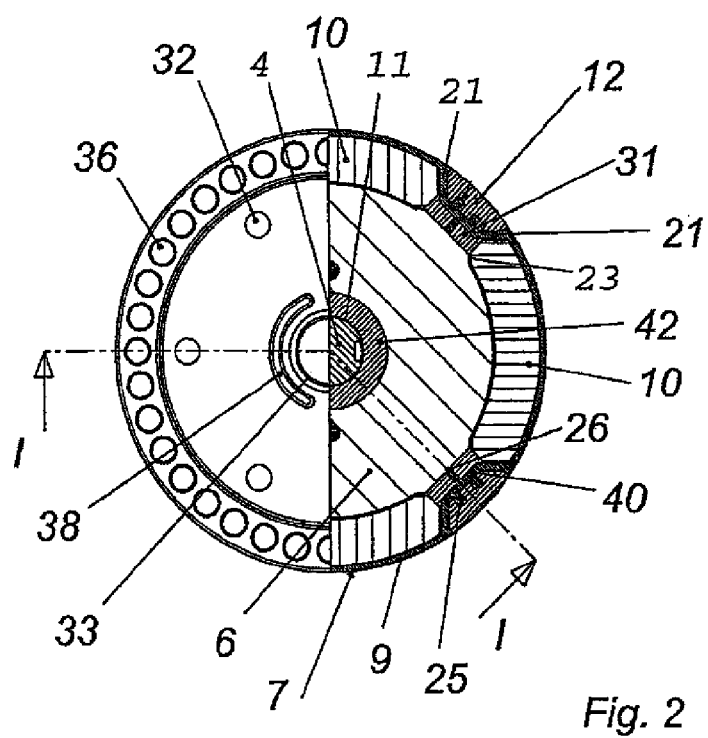
FIG. 2 shows a partially sectioned view from above of a rotor realised according to the present invention.

As shown in FIGS. 2 and 3, the central core 6 exhibits a cylindrical shape, of axis X-X, with an axial passage 11 suitable to allow the crossing of the driving shaft 4.

In the present embodiment, the rotor 3 exhibits four permanent magnets 10.

Figure 4:
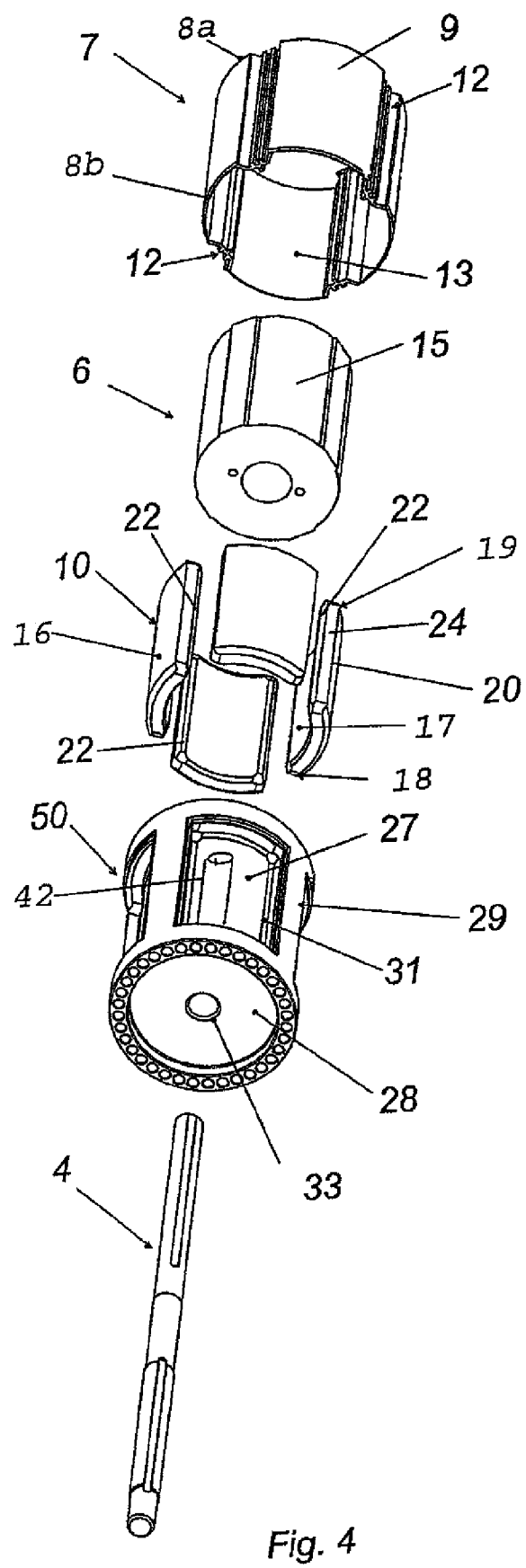
FIG. 4 schematically shows a view ideally made with detached parts, of the rotor of FIG. 3.

Each magnet 10, substantially "tile-like" shaped as shown in FIG. 4, exhibits an extrados 16, an intrados 17 and side edges 18, 19.

Advantageously, according to the present invention, the rotor 3 exhibits a cup-like body 7, realised in a suitable plastic material, comprising a base end 8a, substantially circular, an opposite open end 8b and a side wall 9 exhibiting a plurality of passing longitudinal recesses 12.

Suitably, the symmetrically arranged recesses 12 define, between each other and inside the cup-like body 7, a plurality of positioning seats 13 suitable to house the magnets 10.

Conveniently, the recesses 12 exhibit, along a section transversal to the axis X-X, as shown in FIG. 2, a substantially isosceles trapezium-like shape, comprising a base 40 connected to the side wall 9 by a pair of sides 21.

Advantageously, the core 6 is realised with a plurality of longitudinal recesses 15 suitable to house the intrados 17 of each magnet 10.

Suitably, each recess 15 exhibits, in a section transversal to the axis X-X, a substantially trapezium-like shape, with lateral containment edges 23.

According to the present invention, each of the side edges 18,19 of each magnet 10 comprises a first bevel 20, next to the extrados 16, a second bevel 22, next to the intrados 17, connected by a bulkhead 24.

In particular, each side edge 18, 19 exhibits the first bevel 20 having dimensions substantially greater than the second bevel 22.

In practice, each side 21, of each recess 12, is conjugated to a first bevel 20 of the magnets 10 and each lateral containment edge 23, of each recess 15 is conjugated to a second bevel 22.

Conveniently, the cup-like body 7 and in particular the positioning seats 13, according to the present invention, allow a stable housing and according to the final desired position of the permanent magnets 10, while the recesses 15, of the central core 6, allow to house the intradosses 17 improving the core 6 stability with respect to the magnets 10.

Advantageously, the cup-like body 7 exhibits at least one longitudinal rib 25 projecting from each recess 12.

In particular, according to the present embodiment, the cup-like body 7 exhibits a pair of ribs 25 projecting from the base 40, of each recess 12, outside the cup-like body 7 and a second rib 26 projecting inside the body 7 itself.

In practice, during the mounting step the central core 6 is inserted, with limited clearance, into the cup-like body 7, subsequently the magnets 10 are inserted, with a limited clearance, into the positioning seats 13, between pairs of recesses 12 with the extrados 16 facing the side wall 9, the intrados 17 housed in each recess 15 of the core 6, with the first bevels 20 conjugated to the sides 21 and with the second bevels 22 conjugated to the lateral containment edges 23.

Advantageously, according tot he present invention, the rotor 3 exhibits a substantially cage-like shape structure 50 comprising a plurality of columns 29 extended between opposite bottoms 27,28, wherein the core 6, the magnets 10 and the cup-like body 7 are incorporated.

Suitably, the opposite bottoms 27 and 28 respectively abut at the base end 8a and at the free end 8b of the cup-like body 7 while the plurality of columns 29 are housed in the recesses 12 and they are counter-shaped to them.

Suitably, the cage-like structure 50 is obtained through injection of a suitable plastic material, in the cup-like body 7, and outside it in correspondence with said recesses 12.

Advantageously, according to the present invention, the cage-like structure 50 further comprises a plurality of second columns 31 inside the cup-like body 7 which extend between said opposite bottoms 27,28 and are interposed between adjacent magnets 10 and allow to increase the structural stiffness of the rotor 3.

Preferably, the plastic material used to obtain the structure 50 is the same plastic material with which the cup-like body 7 is realised, or, it is a chemically compatible plastic material and it allows to improve the adhesion between the same to obtain a rotor 3 with particularly massive structure.

The pair of ribs 25 and the second rib 26 allow, besides stiffening the cup-like body 7, also to improve the hold of the plastic material at the recesses 12, making the rotor 3 structurally more massive and strong.

Conveniently, the base end 8a of the cup-like body 7 exhibits a plurality of spacers 32 which, during the injection of the plastic material, are covered by the material itself to define the bottom 27 of the cage-like structure 50.

Advantageously, the cage-like structure 50 exhibits an inner sleeve 42, arranged along the axis X-X, which radially covers the axial passage 11 of the core 6 and extends between the opposite bottoms 27 and 28.

The cup-like body 7, the sleeve 42 and the opposite bottom 27 and 28, realised according to the present invention, define a single body and make the rotor 3 obtained waterproof.

In particular, the sleeve 42 exhibits an inner diameter suitable to define a hole 33 which allows the forced housing of the driving shaft 4. In the present embodiment, the shaft 4 comprises a longitudinal groove 60 suitable to allow a passage of water or of cooling liquid for a bush placed next to the bottom 28 of the rotor 3.

Further, the cage-like structure 50 exhibits, next to the perimeter of said opposite bottoms 27, 28 respectively a first 34 and a second 35 annular flange, suitable to contain a plurality of first 36 and second 37 housing seats for counter-shaped balancing masses.

Suitably, according to the present embodiment, the first seats 36 and the second seats 37 exhibit a cylindrical shape.

The bottom 27 also comprises a pair of projections 38, symmetrically arranged next to the hole 33, which exhibit a substantially "C-like" shape, suitable to allow the insertion of a possible axial thrust bearing bush.

Significant versions can be realised, with respect to the described solution, in particular it is possible to realise the containment element, the core and the magnets so that the core and the magnets are inserted in the cup-like body with a thrust coupling.

The present invention also relates to a method for obtaining the permanent-magnet rotor 3, as previously described.

The method according to the present invention comprises the steps of:

arranging the cup-like body 7, realised in a suitable plastic material; inserting the central core (6) into the cup-like body 7 and arranging, with limited mutual clearance, the permanent magnets 10 in the positioning seats 13.

Subsequently, after the insertion of the cup-like body 7 in a measure-to-measure mould, advantageously the method according to the present invention provides to obtain a cage-like structure 50 by injecting a suitable plastic material into the cup-like body 7 and into the recesses 12. The cage-like structure 50 exhibits the opposite bottoms 27 and 28 abutting at the ends 8a and 8b of the cup-like body 7, and the columns 29, extended between the opposite bottoms 27 and 28, housed in the recesses 12.

Suitably, in the cage-like structure 50 the core 6, the magnets 10 and the cup-like body 7 are incorporated.

Advantageously, during the injection step, the plastic material is injected so as to occupy all the accessible spaces, i.e. the possible gaps between core 6, magnets 10 and cup-like body 7 to realise a plurality of fillings that makes the rotor 3 obtained particularly compact and strong.

In particular, thanks to the shape of the side edges 18, 19 of the magnets 10 and of the recesses 12, according to the present invention, between adjacent magnets 10 a channel is realised, arranged along the axis X-X, which allows to realise a plurality of second inner columns 31 extended between the opposite bottoms 27 and 28.

Suitably moreover, during the injection step, the cage-like structure 50 is realised with the longitudinal sleeve 42 which radially covers the entire axial passage 11 of the core 6 with an inner diameter suitable for the forced housing of the shaft 4.

Moreover, advantageously, the injection step of the polymeric material occurs with injection points arranged symmetrically with respect to the axis X-X and by suitably regulating the injection pressure, this allows to fill, in an excellent way, the interspaces between core 6, cup-like body 7, magnets 10 and mould.

Main advantage of the method according to the present invention is that it allows to obtain, in a quick way, a structurally massive rotor with the magnets steadily housed, according to a final position, in the positioning seats without the help of further components or of adhesives, as well as to maintain them in position, in a stable way, during the injection step.

A further advantage of the method according to the present invention is that of obtaining, in a simple way, a particularly massive and strong rotor with a cup-like body realised in a plastic material and a cage-like structure, obtained by injection, which allows to strengthen the rotor, thanks to the presence of the columns housed in said recesses and extended between the opposite bottoms, which allow to maintain the minimal space outside the rotor, i.e, identical to the one of the cup-like body, maximising in the meantime the structural resistance of the rotor and the reliability also during high speed operation.

An advantage of the rotor realised according to the present invention is linked to the particular shape of the cup-like body which, thanks to the positioning seats, exhibits stable housings according to the final position for the magnets, also during the injection step.

Another advantage of the rotor realised according to the present invention is obtained thanks to the recesses in the core which allow to house, with limited clearance, the intradosses of the magnets thus allowing the core and the magnets themselves to maintain, during the injection of the plastic material, a mutual stable position according to the final position.

Another remarkable advantage of the present invention is that of obtaining a waterproof rotor, in fact, the shape of the cage-like structure, with the inner sleeve extended between the opposite bottoms, allows to incorporate the cup-like body insulating the inner magnets and the core from the water or from the cooling fluid wherein the rotor is immersed.

Another advantage of the rotor obtained according to the present invention is the easiness with which the balancing of the same can be carried out, in fact the plurality of first and second seats realised in opposite bottoms of the cage-like structure allow to use counter-shaped masses correcting, in a quick way, possible balancing faults, both static and dynamic, of the rotor obtained.

The invention claimed is:

1. A synchronous motor, particularly for a pump of a washing machine for industrial and domestic use and the like, comprising:

an external stator; and an internal permanent-magnet rotor to be immersed in a fluid, said internal permanent-magnet rotor comprising:

a cup-like body, formed of a plastic material, comprising a base end, an open end, a side wall, and a plurality of longitudinal recesses on an outer side of said side wall, said longitudinal recesses extending from the base end to the open end of the cup-like body and definining between each other a plurality of positioning seats on the inner side of said side wall;

a central cylindrical core comprising an axis X-X and an axial passage, said central cylindrical core being placed within the cup-like body; and a plurality of permanent magnets surrounding the central cylindrical core and having an extrados and an intrados and side edges, said permanent magnets being placed between the side-wall of the cup-like body and the central cylindrical core with the extrados facing the cup-like body, and being housed within the positioning seats of the cup-like body;

wherein the core, the magnets and the cup-like body are incorporated in a substantially cage-like shaped structure formed of plastic material and having opposite bottoms and columns extended between the opposite bottoms, wherein said opposite bottoms of the cage-like structure abut the ends of the cup-like body in such a way as to sealingly enclose between them the central cylindrical core and the permanent magnets, and wherein said columns of the cage-like structure are housed in the recesses and are counter-shaped to them, in such a way as to define, alone with the side wall of the cup-like body, a cylindrical outer surface of the rotor of the cup-like body.

2. The synchronous motor according to claim 1, wherein said cage-like structure is obtained through injection.

3. The synchronous motor according to claim 2, wherein said plastic material with which the cage-like structure is obtained is the same plastic material with which the cup-like body is formed.

4. The synchronous motor according to claim 2, wherein the core exhibits a plurality of housing recesses for the intrados of the magnets.

5. The synchronous motor according to claim 2, wherein each magnet comprises, in correspondence with each side edge, a first bevel, next to the extrados, and a second bevel, next to the intrados, connected by a bulkhead.

6. The synchronous motor according to claim 5, wherein said recesses exhibit, along a section transversal to the axis (X-X), a substantially trapezium-like shape, comprising a base and a pair of sides which are connected to the side wall, each side of said pair of sides being conjugated to a first bevel.

7. The synchronous motor according to claim 5, wherein said recesses exhibit, along a section transversal to the axis (X-X), a substantially trapezium-like shape, with lateral containment edges conjugated to the second bevels.

8. The synchronous motor according to claim 7, wherein each of said recesses exhibits at least one rib projecting from said cup-like body.

9. The synchronous motor according to claim 1, wherein said cage-like structure comprises a plurality of second columns inside said cup-like body extended between said opposite bottoms and interposed between adjacent magnets.

10. The synchronous motor according to claim 1, wherein said cage-like structure comprises an inner longitudinal sleeve which radially covers the axial passage of the core and extends between the opposite bottoms, said sleeve being realised with an inner diameter suitable to define a hole for the forced housing of the shaft, wherein said cup-like body, said sleeve and said opposite bottoms of the cage-like structure define a single waterproof casing.

11. The synchronous motor according to claim 1, wherein the opposite bottoms comprise at least one plurality of first and second housing seats for counter-shaped balancing masses.

* * * * *